(12) United States Patent
Kim

(10) Patent No.: US 10,623,798 B2
(45) Date of Patent: Apr. 14, 2020

(54) PROCESSOR FOR CREATING INSTRUCTION FOR CHANNEL CHANGE, DISPLAY DEVICE, AND DISPLAY METHOD

(71) Applicant: SAMSUNG ELECTRONICS CO., LTD., Suwon-si (KR)

(72) Inventor: Byuk Sun Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/713,927

(22) Filed: Sep. 25, 2017

(65) Prior Publication Data

US 2018/0103285 A1  Apr. 12, 2018

(30) Foreign Application Priority Data

Oct. 7, 2016  (KR) .................. 10-2016-0129854

(51) Int. Cl.
*H04N 21/422* (2011.01)
*H04N 21/81* (2011.01)
(Continued)

(52) U.S. Cl.
CPC ..... *H04N 21/42207* (2013.01); *H04N 5/4403* (2013.01); *H04N 21/4104* (2013.01);
(Continued)

(58) Field of Classification Search
CPC ....... H04N 21/42221; H04N 21/42222; H04N 21/42204; H04N 21/431; H04N 21/472; H04N 21/4755; H04N 21/482; H04N 2005/4407; H04N 2005/4426; H04N 21/42207; H04N 21/42225;
(Continued)

(56) References Cited

U.S. PATENT DOCUMENTS 9,055,259 B2  6/2015 An et al.
2006/0277050 A1* 12/2006 Kaneko ............ H04N 21/42203
704/275

(Continued)

FOREIGN PATENT DOCUMENTS

EP  2 701 394 A1  2/2014
KR  101621097 B1  5/2016

OTHER PUBLICATIONS

Communication dated Feb. 6, 2018, issued by the European patent Office in counterpart European application No. 17195056.1.

*Primary Examiner* — Hai V Tran
(74) *Attorney, Agent, or Firm* — Sughrue Mion, PLLC

(57) ABSTRACT

A display device including a first communication interface configured to communicate with at least one remote controller, a display configured to output an image, a speaker configured to output sound, and a processor configured to detect a control code from a signal received from the at least one remote controller through the first communication interface, analyze a channel change operation corresponding to a changing of a channel according to an intention of a user based on the control code and at least one of the image and the sound, select at least one preferred channel preferred by the user based on a result of the analysis, and create at least one control instruction for performing the channel change operation to the at least one preferred channel.

17 Claims, 8 Drawing Sheets

(51) Int. Cl.
*H04N 1/44* (2006.01)
*H04N 21/466* (2011.01)
*H04N 21/436* (2011.01)
*H04N 5/44* (2011.01)
*H04N 21/41* (2011.01)
*H04N 21/438* (2011.01)
*H04N 21/442* (2011.01)
*H04N 21/45* (2011.01)
*H04N 21/44* (2011.01)

(52) U.S. Cl.
CPC . *H04N 21/42204* (2013.01); *H04N 21/42225* (2013.01); *H04N 21/4383* (2013.01); *H04N 21/43615* (2013.01); *H04N 21/44008* (2013.01); *H04N 21/44222* (2013.01); *H04N 21/4532* (2013.01); *H04N 21/4667* (2013.01); *H04N 21/8186* (2013.01); *H04N 2005/4405* (2013.01); *H04N 2005/4444* (2013.01)

(58) Field of Classification Search
CPC ....... H04N 21/42226; H04N 21/43615; H04N 21/44008; H04N 21/8186; H04N 2201/0089; H04N 5/4403
See application file for complete search history.

(56) References Cited

U.S. PATENT DOCUMENTS

| | | | |
|---|---|---|---|
| 2008/0127253 A1* | 5/2008 | Zhang | H04N 21/44204 725/35 |
| 2013/0258207 A1* | 10/2013 | Kim | H04N 21/42207 348/734 |
| 2014/0055675 A1* | 2/2014 | An | H04N 21/42207 348/569 |
| 2014/0075491 A1 | 3/2014 | Hsu et al. | |
| 2014/0282714 A1* | 9/2014 | Hussain | H04N 21/4263 725/34 |
| 2015/0137959 A1 | 5/2015 | Kim et al. | |
| 2015/0208120 A1* | 7/2015 | Yao | H04N 21/25833 725/9 |
| 2017/0243474 A1* | 8/2017 | Greene | H04N 21/42203 |
| 2017/0257660 A1* | 9/2017 | Liu | H04N 21/422 |

\* cited by examiner

PROCESSOR FOR CREATING INSTRUCTION FOR CHANNEL CHANGE, DISPLAY DEVICE, AND DISPLAY METHOD

CROSS-REFERENCE TO RELATED APPLICATION

This application claims priority from Korean Patent Application No. 10-2016-0129854, filed on Oct. 7, 2016 in the Korean Intellectual Property Office, the entire disclosure of which is hereby incorporated by reference in its entirety.

TECHNICAL FIELD

Example embodiments of the present disclosure relate to a processor capable of creating an instruction (e.g. control code) for a channel change, a display device, and a display method.

BACKGROUND

Various peripheral devices, such as a set-top box (STB), a Blu-ray disk (BD), an audio system, a mobile device, a personal computer (PC), and an external memory, are increasingly used in connection with a display device.

A related art display device may receive contents, such as images and sounds, through a large number of channels established through peripheral devices connected with the display device. The peripheral devices may receive control signals from mutually different remote controllers and may be driven in response to the received control signals.

SUMMARY

A related display device has created a user interface (UI) for channels, which have been recently used, by recognizing a key number of a remote control of a company employing an identifier code (ID) associated with the display device.

Example embodiments provide a processor capable of creating an instruction for a channel change of a remote controller, which does not use an associated ID code, a display device, and a display method.

According to an aspect of an exemplary embodiment a display device includes a first communication interface configured to communicate with at least one remote controller, a display configured to output an image, a speaker configured to output sound, and a processor configured to detect a control code from a signal received from the at least one remote controller through the first communication interface, analyze a channel change operation corresponding to a changing of a channel according to an intention of a user based on the control code and at least one of the image and the sound, select at least one preferred channel preferred by the user based on a result of the analysis, and create at least one control instruction for performing the channel change operation to the at least one preferred channel.

The processor may be further configured to determine whether to perform the channel change operation by using the control code and the at least one of the image and the sound.

In response to detecting channel information including at least one of a channel name and a channel logo in a specified area of the image, the processor may be further configured to determine whether the detected channel information is different from previously detected channel information, and determine that the channel change operation was performed if the detected channel information is different from the previously detected channel information.

The processor may be further configured to recognize the sound using a voice recognition scheme, in response to detecting channel information from the sound, determine whether the channel information is different from previously detected channel information, and determine that the channel change operation was performed if the detected channel information is different from the previously detected channel information.

The processor may be further configured to determine that the channel change operation was not performed if the processor fails to detect the at least one channel information from the at least one of the image and the sound after receiving the control code.

The processor may be further configured to analyze the channel change operation if the channel is held for a period of time longer than a threshold period of time.

The display device may further include a memory configured to store code recognition information including at least one of a device type, a key type, and a key code, and the processor may be further configured to determine a key code corresponding to the channel change operation based on the code recognition information.

The at least one remote controller may include at least one first remote controller configured to remotely control at least one peripheral device connected with the display device, and
wherein the processor may be further configured to analyze the channel change operation based on the control code received from the at least one first remote controller.

The at least one remote controller may further include a second remote controller configured to remotely control the display device, and the processor may be further configured to determine at least one key code for changing the channel to the at least one preferred channel from the control code received from the first remote controller, and to create a control instruction recognizable by the second remote controller using the at least one key code, and the control instruction may allow the second remote controller to change the channel to the preferred channel using a peripheral device connected with the display device.

The display device may further include a display, and the processor may be further configured to create at least one preferred channel user interface (UI) for execution of the at least one control instruction, and in response to a specified menu being selected, output the at least one preferred channel UI to the display.

The at least one remote controller may include a second remote controller configured to remotely control the display device, and the processor may be further configured to, in response to a channel being selected from among channels included in the at least one preferred channel UI, transmit a control instruction for a channel change to the selected channel to the second remote controller through the first communication interface.

According to another aspect of an exemplary embodiment, a display method by a display device includes detecting a control code from a signal received from at least one remote controller, analyzing a channel change operation corresponding to a changing of a channel according to an intention of a user based on the control code and at least one of an image output by a display, and sound output by a speaker, selecting at least one preferred channel preferred by the user based on a result of the analyzing, and creating at least one control instruction for performing the channel change operation to the at least one preferred channel.

The analyzing of the channel change operation may include detecting channel information from at least one of the image and the sound corresponding to the control code, in response to the channel information being detected, determining whether the channel information is different from a previously detected channel information, and determining that the channel change operation has occurred if the detected channel information is different from the previously detected channel information.

The analyzing of the channel change operation may include determining whether the channel is held for a period of time longer than a threshold period of time, and determining that the channel change operation was performed according to an intention of the user if the channel is held for the period of time longer than the threshold period of time.

The analyzing of the channel change operation may include determining that the channel change operation was not performed according to an intention of the user if the channel information is not detected from the at least one of the image and the sound.

The analyzing of the channel change operation may include determining a key code for the channel change operation from the control code based on code recognition information including at least one of a device type, a key type, and a key code.

The at least one remote controller may include at least one first remote controller configured to remotely control at least one peripheral device connected with the display device, and at least one second remote controller configured to remotely control the display device, wherein the creating of the at least one control instruction may include determining at least one key code for the channel change operation to the preferred channel from the control code received from the at least one first remote controller, and creating the control instruction, which is recognizable by the second remote controller, using the at least one key code, and the control instruction may allow the second remote controller to perform the channel change operation to the preferred channel using a peripheral device.

The display method may further include creating at least one preferred channel UI for execution of the at least one control instruction, in response to a specified menu being selected, outputting the at least one preferred channel UI on the display, determining whether a channel is selected from among channels included in the at least one preferred channel UI, and in response to the channel being selected, transmitting a control instruction for a channel change operation to the selected channel to a second remote controller.

According to another aspect of an exemplary embodiment, a processor includes an event detector configured to detect channel information from at least one of an image output by a display, and sound output by a speaker, a filter configured to select a channel change operation using a control code associated with the channel change operation and the channel information, an integrator configured to combine the channel information with the control code associated with the selected channel change operation, and a user interface (UI) constructor configured to create a preferred channel UI corresponding to the channel information and the control code in response to a number of uses of the control code being higher than a threshold number of uses.

The filter may be further configured to, in response to the channel information being detected based on at least one of the output image, and the output sound, determine whether the channel information is different from a previously detected channel information, and determine that the channel change operation was performed according to an intention of a user if the detected channel information is different from the previously detected channel information.

BRIEF DESCRIPTION OF THE DRAWINGS

The above and/or other aspects will be more apparent from the following description of exemplary embodiments taken in conjunction with the accompanying drawings, in which.

DETAILED DESCRIPTION

Hereinafter, certain exemplary embodiments will be described with reference to accompanying drawings. Accordingly, those of ordinary skill in the art will recognize that modifications, equivalents, and/or alternatives on the various exemplary embodiments described herein may be made without departing from the scope and spirit of the present disclosure. Throughout the drawings, it should be noted that like reference numbers are used to depict the same or similar elements, features, and structures.

The terms of a singular form may include plural forms unless otherwise specified. In the present disclosure, the expressions "A or B", "at least one of A and B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "operatively or communicatively coupled with/to" or "connected to" another element (e.g., a second element), the element may be directly coupled with/to or connected to the another element or an intervening element (e.g., a third element) may be present therebetween.

In the present disclosure, according to the situation, the expression "adapted to or configured to" used herein may be interchangeably used with, for example, the expression "suitable for", "having the capacity to", "changed to", "made to", "capable of", or "designed to" "adapted to", "made to", or "capable of". Under a certain situation, the expression "a device configured to" may mean that the device is "capable of" operating together with another device or other components. For example, a "processor configured to, or adapted to, perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Figure 1:
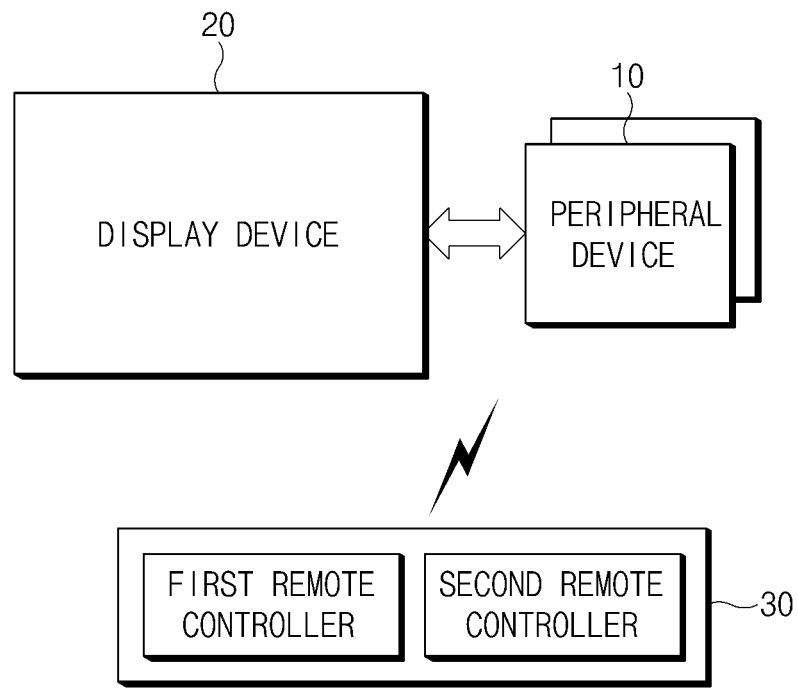
FIG. 1 is a block diagram illustrating a display system, according to an exemplary embodiment.

FIG. 1 is a block diagram illustrating a display system, according to an exemplary embodiment.

As illustrated in FIG. 1, according to an exemplary embodiment, the display system may include at least one peripheral device 10, at least one remote controller 30, and a display device 20.

According to an exemplary embodiment, the at least one peripheral device 10 may be a source device which provides at least one of an image and sound. For example, the at least one peripheral device 10 may be various devices such as a digital versatile disc (DVD) player, a CD player, an STB, a mobile terminal, a PC, or an external memory (e.g., a universal serial bus (USB), a secure digital (SD) card, or the like).

According to an exemplary embodiment, each peripheral device 10 may be connected with the display device 20 through a first interface. For example, the first interface may include at least one of a high definition multimedia interface (HDMI), a digital video/visual interactive (DVI), an optical interface, a D-subminiature (D-sub), a display port, and a memory interface. The memory interface may include various interfaces such as an SD card, an USB interface, and a multimedia card (MMC) interface.

According to an exemplary embodiment, at least one remote controller 30 may control at least one of the display device 20 and the peripheral device 10. At least one remote controller 30 may communicate with the display device 20 or the at least one peripheral device 10 through various schemes such as Bluetooth communication, Infrared (IR) communication, Zigbee communication, or ultrasonic wave communication. For example, each remote controller 30 may make communication through at least one communication scheme and may provide a user with a function of remotely controlling at least one of the display device 20 and the peripheral device 10.

According to an exemplary embodiment, the at least one remote controller 30 may include a first remote controller and at least one second remote controller.

The first remote controller, which is a device for employing an ID code associated with the display device 20, may transmit a control code including an ID code of the display device 20 to remotely control the display device 20. For example, the first remote controller may transmit, to the display device 20, a control code including a key code for a key manipulated by a user and the ID code (e.g., custom code) of the display device 20. The key code may include at least one of codes for remotely controlling a channel change, a power on/off, and a menu selection of the display device 20. Alternatively, as the first remote controller transmits at least one control code to another peripheral device in response to a control instruction from the display device 20, the first remote controller may control the another peripheral device. In this case, the first remote controller may transmit, to another peripheral device, at least one control code corresponding to the control instruction from the display device 20. The control code to the another peripheral device may include an ID code of the another peripheral device and a key code for controlling the another peripheral device.

The second remote controller may be a device for employing an ID code associated with the at least one peripheral devices 10. For example, as the second remote controller transmits a control code, which includes an ID code of a first peripheral device of the at least one peripheral device 10, to the first peripheral device, the second remote controller may remotely control the first peripheral device. The control code may include the ID code of the first peripheral device and a key code corresponding to a key according to the manipulation of the user. The first peripheral device may be a peripheral device currently connected with the display device 20.

According to an exemplary embodiment, the display device 20 may output at least one of an image and sound included in a signal received through an internal channel or an external channel. According to an exemplary embodiment, the internal channel is a channel which is changed by an element (e.g., a tuner) of the display device 20. The external channel may be a channel which is changed by an element of the peripheral device 10. The internal channel may be a channel received by the display device 20 through an antenna. For example, the display device 20 may output an image, which is provided from the at least one peripheral device 10, to a display 240 (see FIG. 2) and may output sound, which is provided from the at least one peripheral device 10, through a speaker 250 (see FIG. 2).

According to an exemplary embodiment, the display device 20 may create and store preferred channel information of a user by analyzing at least one of a control code received from the remote controller 30, a signal received from at least one peripheral device 10, the image output by the display, and the sound output by the speaker. For example, the preferred channel information may include a preferred channel UI for displaying the outline of a preferred channel and a control code for a channel change to each preferred channel. The preferred channel may include at least one of the internal channel, which is internally changed in the display device 20, and the external channel which is changed due to the channel change of the at least one peripheral device 10.

According to an exemplary embodiment, when a specified menu is selected, the display device 20 may output the preferred channel UI to the display. If one channel is selected from the preferred channel UI through the remote controller 30 by the user, the display device 20 may perform the channel change to the selected channel. For example, if the selected channel is the external channel, the display device 20 may transmit, to the first remote controller, a control instruction for indicating the first remote controller to transmit at least one control code for the channel change to the selected channel. The first remote controller may identify the selected channel from the control instruction if receiving the control instruction. Then, the first remote controller may transmit the at least one control code corresponding to the identified channel to the peripheral device 10 corresponding to the selected external channel. The peripheral device 10 corresponding to the selected external channel may output a source of the selected external channel to the display device 20, and the display device 20 may provide the selected external channel to the user.

According to an exemplary embodiment, the display device may analyze the control code from at least one remote controller to automatically create a user preferred channel. If a preferred channel is selected by the user, a channel change may be performed to the preferred channel without using another remote controller. Accordingly, the convenience of the channel change by the user may be significantly improved.

Figure 2:
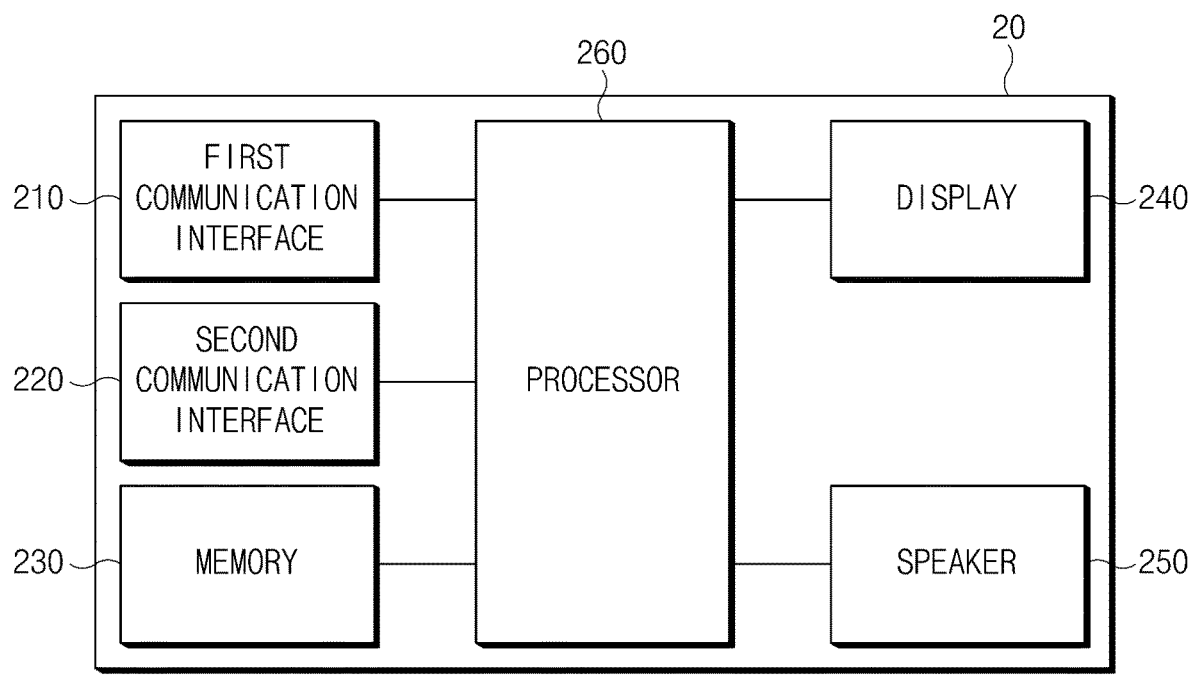
FIG. 2 is a block diagram illustrating a display device, according to an exemplary embodiment.

FIG. 2 is a block diagram illustrating a display device, according to an exemplary embodiment.

As illustrated in FIG. 2, according to an exemplary embodiment, the display device 20 may include a first communication interface 210, a second communication interface 220, a memory 230, a display 240, a speaker 250, and a processor 260. At least one of elements of the display device 20 may be omitted. The elements of the display device 20 may be included in respective different devices and may be connected with the display device 20 through a communication interface. For example, the speaker 250 may be an external device, and the remaining elements of the display device 20 except the speaker 250 may be included in the display device 20. In this case, the remaining elements except the speaker 250 may be connected with the speaker 250 through a plug and thus sound may be transmitted to the speaker 250 through the plug.

According to an exemplary embodiment, the first communication interface 210 may communicate with at least one remote controller 30 in a wireless (or wired) scheme. For example, the first communication interface 210 may be a transceiver configured to communicate with the remote controller 30 through various schemes such as Bluetooth communication, infrared (IR) communication, Zigbee communication, and ultrasonic wave communication.

According to an exemplary embodiment, the first communication interface 210 may extract a control code from a signal received from the first remote controller or the second remote controller and may send the control code to the processor 260. The first communication interface 210 may transmit a control instruction including a control code sent from the processor 260 to the first remote controller. For example, the first communication interface 210 may include at least one of an IR receiver and a wide band IR receiver of the display device.

According to an exemplary embodiment, the second communication interface 220 may receive a source from the peripheral device 10 which provides the source through at least one interface and may transmit the source to the processor 260. For example, the at least one interface may include at least one of an HDMI, a DVI, an optical interface, a D-subminiature (D-sub), a display port, and a memory interface. The memory interface may include at least one of an SD card, an USB interface, an MMC interface, and the like.

According to an exemplary embodiment, the memory 230 may store at least one of channel identification information, preferred channel control information, and code analysis information. For example, the channel identification information may include a channel name text, channel name sound and/or a channel logo. The preferred channel information may include a preferred channel UI and a control signal created by the processor 260. The code analysis information may be information necessary for analyzing a control code from each remote controller and for creating a control code, which is analyzable, by the first remote controller. For example, the code analysis information may include a device type, a key type, and a key code.

According to an exemplary embodiment, the display 240 may output the preferred channel UI on a specified screen in response to the indication of the processor 260. For example, the specified screen may be a screen displayed in the state that the home button or the menu button is manipulated. The display 240 may include at least one of a liquid crystal display (LCD), a light emitting diode (LED) display, an organic LED (OLED) display, a micro electro mechanical systems (MEMS) display, and an electronic paper display. The display 240 may be a flat display or a curved display.

According to an exemplary embodiment, the speaker 250 may output sound according to the instruction of the processor 260. The speaker 250 may be provided in the display device 20 or provided outside the display device 20 and may be connected with the display device 20 through a specified interface.

According to an exemplary embodiment, the processor 260 may create preferred channel control information by selectively learning the control code from the first communication interface 210 and at least one of the variations of the image and the sound received through the internal channel or the external channel (e.g., the second communication interface 220). The learning may including, for example, analyzing the channel code. For example, the processor 260 may extract at least one control code from a signal, which is received through the first communication interface 210, based on the code analysis information stored in the memory 230. The processor 260 may detect channel information (e.g., a channel name) by using at least one of variations of the image and the sound received through the internal channel or the external channel. If the processor 260 fails to detect the channel information after receiving the control code, the processor 260 may determine the channel change as being absent or may not determine the channel change as being performed according to the intention of the user. If the detected channel information is different from previously detected channel information, the processor 260 may determine the channel as being changed. If the channel is changed, the processor 260 may determine whether the channel change is performed according to the intention of the user by using a holding time of the changed channel. For example, if the holding time of the changed channel is equal to or greater than a specified threshold period of time, the processor 260 may determine the channel change as being performed according to the intention of the user.

According to an exemplary embodiment, the processor 260 may additionally or alternatively learn the control code received and detected through the second communication interface 220 to learn the channel change according to the intention of the user. For example, the channel change may occur as the user manipulates an external key of the peripheral device 10 instead of the remote controller 30. In this case, the processor 260 may determine the channel change as being performed according to the intention of the user, by using at least one of the control code through the second communication interface 220 and the output image, or the output sound.

According to an exemplary embodiment, if the processor 260 determines the channel change as being performed according to the intention of the user, the processor 260 may determine the changed channel as a preferred channel or a preferred channel candidate and may combine at least one control code and channel information corresponding to the channel. Since the remote controller 30 transmits a plurality of control codes, the processor 260 may selectively learn a control code related to the channel change among the control codes. The processor 260 may periodically detect channel information from at least one of the image and the sound. If the channel information is different from previous channel information, the processor 260 may determine the channel as being changed. According an exemplary embodiment, the processor 260 may determine a control codes which is received for a specified period of time (e.g., 10 seconds) from a time point in which the channel is determined as being changed, as a control code for the change of one channel. The processor 260 may additionally or alternatively select a control code for the change of one channel by using the time interval between control codes. For example, the processor 260 may combine the control codes received at less than a specified time interval (e.g., 3 seconds) there between together to make control codes for the change of one channel. The processor 260 may determine control codes, which are received at less than a specified time interval, among control codes received for a specified period of time, as control codes for the change of one channel and thus may combine the control codes together. According to an exemplary embodiment, the processor 260 may record at least one integrated control code and channel information in the memory 230.

According to an exemplary embodiment, the processor 260 may select some channels representing the higher frequencies of use among preferred channels or preferred channel candidates and may create preferred channel UIs for the selected channels. For example, the processor 260 may select channels representing the frequency of use, which is equal to or greater than a threshold frequency of use, from among the list of the whole preferred channels and may create preferred channel UIs for the selected channels. According to an exemplary embodiment, when the processor 260 outputs the preferred channel UIs to the display 240, the processor 260 may sort and output the preferred channel UIs in descending order of the frequencies of use.

According to an exemplary embodiment, if any one channel is selected from among preferred channels provided in preferred channel UIs, the processor 260 may transmit a control code corresponding to the selected channel to the first communication interface 210. For example, the processor 260 may search the memory 230 for the control code corresponding to the selected channel and may transmit the searched control code to the first remote controller through the first communication interface 210. Then, the first remote controller may perform a channel change with respect to peripheral devices connected through another channel as well as a present channel of the display device 20.

According to an exemplary embodiment, the display device 20 may verify a preferred channel of a user based on a control code received from a remote controller that does not use (does not recognize) the ID code of the display device 20. According to various exemplary embodiments, as the UI of the verified preferred channel is automatically created, the convenience of the channel change to the preferred channel by the user may be significantly improved.

Figure 3:
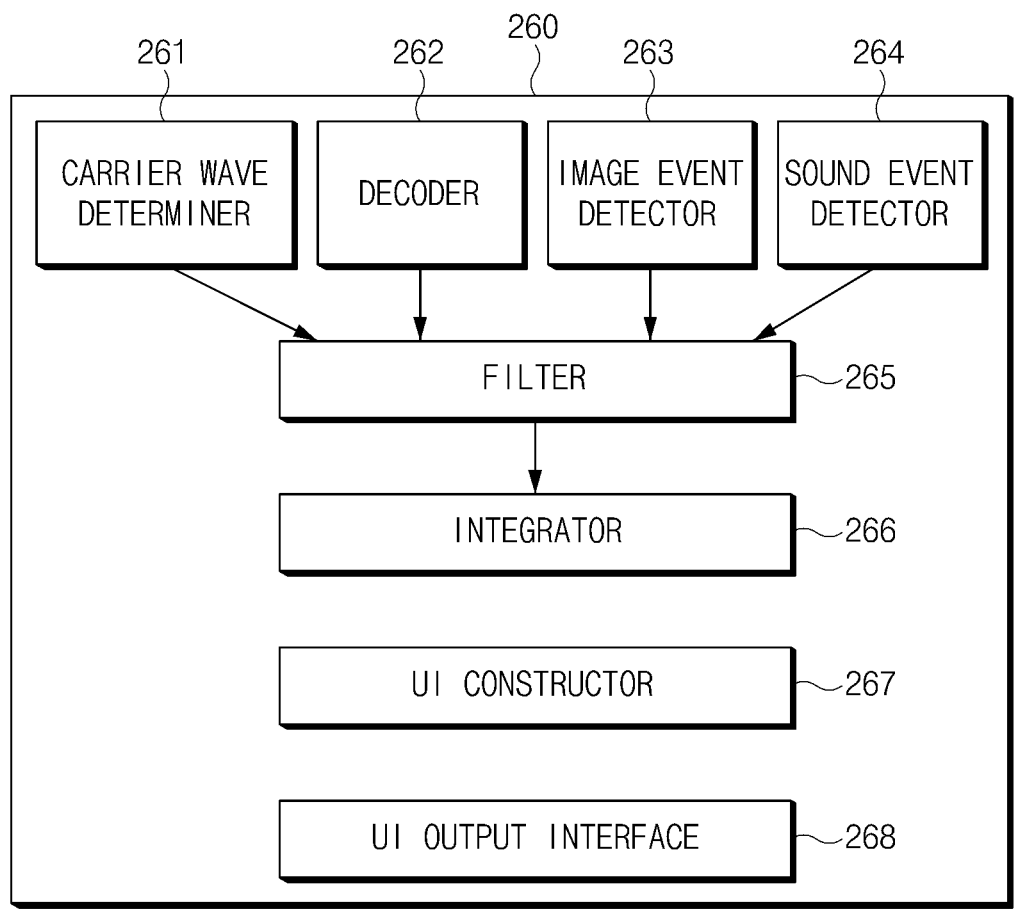
FIG. 3 is a block diagram illustrating a processor according to an exemplary embodiment.

FIG. 3 is a block diagram illustrating a processor according to an exemplary embodiment.

As illustrated in FIG. 3, according to an exemplary embodiment, the processor 260 may include a carrier wave determiner 261, a decoder 262, an image event detector 263, a sound event detector 264, a filter 265, an integrator 266, and an UI constructor 267. At least one of elements of the processor 260 may be omitted and at least two of the elements of the processor 260 may be integrated with each other. Each element of the processor 260 may be an individual hardware module or a software module implemented by at least one processor. For example, functions of the modules included in the processor 260 may be performed by a single processor or may be individually performed by separate processors, respectively. The processor 260 may be implemented in the form of a system on chip (SoC) including at least one of an application processor (AP), a central processing unit (CPU), a graphic processing unit (GPU), and a memory.

According to an exemplary embodiment, the carrier wave determiner 261 may determine a carrier wave frequency from a signal having the band of 20 kHZ to 60 kHZ received from the second remote controller. According to an exemplary embodiment, the carrier wave determiner 261 may include at least some elements of a wide band IR receiver. The carrier wave determiner 261 may be included in the first communication interface 210. The carrier wave determiner 261 may transmit the determined carrier wave frequency to the decoder 262. For example, the carrier wave frequency may be a frequency, such as 38 kHz or 56 kHz, used for the transceiving of a remote control. According to an exemplary embodiment, the carrier wave determiner 261 may determine a frequency band for Bluetooth communication, IR communication, Zigbee communication, and ultrasonic communication.

According to an exemplary embodiment, the decoder 262 may extract and analyze a control code from a wireless signal, which is received from the second remote controller, based on code analysis information stored in the memory 230. According to an exemplary embodiment, the control code from the second remote controller may include a second ID code different from the first ID code (e.g., a custom code) associated with the display device 20. Accordingly, the decoder 262 may analyze the control code extracted from the wireless signal received from the second remote controller, based on a device type, a key type, and a key code. The decoder 262 may transmit the analyzed control code to the filter 265. According to an exemplary embodiment, the decoder 262 may be included in the first communication interface 210. The decoder 262 may analyze the control code for the changed change by additionally or alternatively using the carrier wave frequency.

According to an exemplary embodiment, the image event detector 263 may analyze an image received through the external channel or the internal channel. According to an exemplary embodiment, the external channel may be a channel provided from the peripheral device 10 connected with at least one interface. The internal channel may be a channel which is changeable by using an internal element such as an antenna, a tuner, or the like. According to an exemplary embodiment, the image event detector 263 may recognize a text or an image in a specified area of the image output by the display 240 and may detect channel information based on the recognized result and stored channel identification information (e.g., by comparing the recognized result and the stored channel identification information). The specified area may be an area on which channel information is displayed. For example, the specified area may be the right upper area of the display 240. According to an exemplary embodiment, the image event detector 263 may analyze the variation of images periodically received. The image event detector 263 may analyze the variation of the images received after the time point in which the control code is received through the first communication interface 210.

According to an exemplary embodiment, the sound event detector 264 may analyze sound received through the external channel or the internal channel. For example, the sound event detector 264 may recognize and detect channel identification information (e.g., a channel name) from sound output from the speaker 250 or sound to be output from the speaker 250 by using a voice recognition technology. The sound event detector 264 may detect channel information, which corresponds to the channel identification information (e.g., a channel name) included in the memory 230, from the recognized sound. According to an exemplary embodiment, the sound event detector 264 may periodically analyze the received sound. The sound event detector 264 may analyze the sound received after the time point in which the control code is received through the first communication interface 210.

According to an exemplary embodiment, the sound event detector 264 may analyze sound received through a microphone and detect the channel information. The microphone may be included in the remote controller 30 or may be included in the display device 20. In the case that the microphone is included in the remote controller 30, the processor 260 (e.g., the sound event detector) may instruct the remote controller 30 to turn on the microphone at the time point in which the first control code is received. Then, the remote controller 30 may activate the microphone according to the indication of the processor 260 and may transmit the sound detected through the microphone to the display device 20. For example, the processor 260 may instruct the remote controller 30 to deactivate the remote controller 30 at the time point in which the control code is not received any more. Then, the remote controller 30 may deactivate the microphone according to the indication of the processor 260. Alternatively, the remote controller 30 may automatically deactivate the microphone after the key manipulation by the user is terminated. In the case that the microphone is included in the display device 20, the processor 260 may activate or deactivate the microphone included in the display device 20.

According to an exemplary embodiment, the filter 265 may select a channel change according to the intention of the user by using at least one of the received control code, the image analysis result, or the sound analysis result. For example, the filter 265 may determine whether the channel information, which is detected from at least one of the image analysis result and the sound analysis result, is different from previously detected channel information. If the detected channel information is different from the previously detected channel information, the filter 265 may determine the channel as being changed. The filter 265 may not determine the channel change as being performed according to the intention of the user, if the filter 265 fails to detect channel information from the at least one of the image analysis result or the sound analysis result after receiving the control code. For example, the filter 265 may determine the channel change as being performed to a channel having no output occurrence, if the filter 265 fails to detect the channel information from the at least one of the image analysis result and the sound analysis result after receiving the control code.

According to an exemplary embodiment, the filter 265 may determine whether the channel change is performed according to the intention of the user by additionally or alternatively using a holding time of the changed channel. For example, the filter 265 may determine the channel change as being performed according to the intention of the user if the holding time of the changed channel is a specified threshold time (e.g., 30 minutes).

According to an exemplary embodiment, the filter 265 may additionally or alternatively learn a control code detected through the second communication interface 220 to learn the channel change according to the intention of the user. For example, the channel change may occur as the user manipulates an external key of the peripheral device 10. In this case, the filter 265 may determine whether the channel change is performed according to the intention of the user, by using the control code through the second communication interface 220 and at least one of the output image, and the output sound.

According to an exemplary embodiment, the integrator 266 may combine at least one control code and channel information corresponding to the channel selected by the filter 265. For example, the integrator 266 may combine the at least one control code for a channel change to the selected channel with the channel information of the selected channel. Since a plurality of control codes are transceived for the change of one channel, the integrator 266 may combine the control codes for the change of one selected channel together by linking the control codes to each other.

According to an exemplary embodiment, the integrator 266 needs to selectively learn the control codes related to the channel change among the control codes received from the remote controller 30. The integrator 266 may combine control codes, which are received for a specified period of time (e.g., 10 seconds) from a time point in which the channel change is determined, together to make a control code for the change of one channel. The integrator 266 may additionally or alternatively select the control code for the change of one channel by using the time interval between control codes. For example, the integrator 266 may select control codes received at less than a specified time interval (e.g., 3 seconds) therebetween as control codes for the change of one channel. The integrator 266 may determine control codes, which are received at less than a specified time interval among control codes received for a specified period of time, as control codes for the change of one channel and thus may combine the control codes.

According to an exemplary embodiment, the integrator 266 may record at least one control code which is the combination result and channel information, which serves as a preferred channel or a preferred channel candidate, in the memory 230. According to an exemplary embodiment, the integrator 266 may record the number of times of recognizing the preferred channel or the preferred channel candidate with a link to the combination result in the memory 230. The control code may include an ID code of the display device 20 or an ID code of another peripheral device.

According to an exemplary embodiment, the UI constructor 267 may compare the preferred channel candidate with a preferred channel UI or a preferred channel list stored in the memory 230 to determine whether to create the preferred channel UI for the preferred channel candidate. For example, the UI constructor 267 may create a preferred channel UI for the preferred channel candidate in the case that the channel change to the preferred channel candidate is recognized by specified threshold number of times (e.g., two times) or more. The preferred channel UI may include the outline information (e.g., a channel logo) of a preferred channel. If each preferred channel UI is selected, the preferred channel UI may include at least one control code and a control instruction for the channel change to each preferred channel. If each preferred channel UI is selected, the control instruction may be an instruction for indicating the first remote controller to transmit at least one control code. According to an exemplary embodiment, the UI constructor 267 may record the created preferred channel UI and the control instruction (or at least one control code) in the memory 230 with a link therebetween.

According to another exemplary embodiment, the UI constructor 267 may create a preferred channel UI if the preferred channel UI for a preferred channel candidate is absent regardless of the recognition number of times. The UI constructor 267 may delete a preferred channel, which is not used for a threshold period of time (e.g., 30 days), among preferred channels having created preferred channel UIs.

According to an exemplary embodiment, a UI output interface 268 may output a preferred channel UI when a specified screen is output. The specified screen may be a menu output in the state that a specified button (e.g., a home button, a menu button, or a preferred channel button) is manipulated. According to an exemplary embodiment, if any one channel is selected from among preferred channels provided to the preferred channel UI, the UI output interface 268 may search for at least one control instruction corresponding to the channel selected from the memory 230 and may transmit the searched control instruction to the first remote controller through the first communication interface 210.

According to another exemplary embodiment, the UI output interface 268 may change and transmit the control instruction. For example, if the peripheral device 10 corresponding to the selected channel is connected through the first interface (e.g., HDMI), the UI output interface 268 may transmit a control instruction (e.g., HDMI-CEC) for indicating a channel change through the first interface instead of transmitting the control instruction through the first communication interface 210.

According to various exemplary embodiments, the channel change to the preferred channel may be performed without using a plurality of remote controllers. Accordingly, the convenience of the channel change by the user may be improved.

According to another exemplary embodiment, a display device includes a first communication interface configured to communicate with at least one remote controller; a display configured to output an image; a speaker configured to output sound; and a processor electrically connected with the first communication interface, the display, and the speaker, wherein the processor is configured to detect a control code from a signal received from the at least one remote controller through the first communication interface; learn a channel change according to intention of a user based on the control code and at least one of the image and the sound; select at least one preferred channel preferred by the user based on a result of the learning on the channel change; and create at least one control instruction for changing a channel to the at least one preferred channel.

The processor may be further configured to determine whether to perform the channel change by using the control code and the at least one of image and the sound.

The processor may be further configured to, if detecting channel information on at least one of a channel name and a channel log in a specified area of the image, determine whether the detected channel information is different from previously detected channel information; and determine the channel as being changed if the detected channel information is different from the previously detected channel information.

The processor may be further configured to recognize the sound through a voice recognition scheme; determine whether channel information corresponding to specified channel identification information is different from previously detected channel information if detecting the channel information from the sound; and determine the channel as being changed if the detected channel information is different from the previously detected channel information.

The processor may be further configured to determine that the channel change is not performed according to the intention of the user if the processor fails to detect the at least one channel information from at least one of the image and the sound after receiving the control code.

The processor may be further configured to learn the channel change if the changed channel is held for a threshold period of time.

According to another exemplary embodiment, a display device further includes a memory configured to store code recognition information including at least one of a device type, a key type, and a key code, wherein the processor is configured to analyze a key code for a channel change based on the code recognition information.

The at least one remote controller may include: at least one first remote controller configured to remotely control at least one peripheral device connected with the display device, and the processor may be configured to learn the channel change according to the intention of the user based on the control code which is received from the at least one first remote controller.

The at least one remote controller may further include: a second remote controller configured to remotely control the display device, and the processor may be further configured to analyze at least one key code for changing the channel to the at least one preferred channel from the control code which received from the first remote controller and create the control instruction which is analyzable by the second remote controller by using the at least one key code. The control instruction allows the second remote controller to change the channel to the individual preferred channel for a peripheral device which is connected with the display device to provide the at least one preferred channel.

The processor may be further configured to additionally create at least one preferred channel user interface (UI) for execution of the at least one control instruction, and output the at least one preferred channel UI to the display, if a specified menu is selected.

The at least one remote controller may include a second remote controller configured to remotely control the display device, and wherein the processor is configured to, if one channel is selected from among channels included in the at least one preferred channel UI, transmit a control instruction for a channel change to the selected channel to the second remote controller through the first communication interface.

According to another exemplary embodiment, a processor includes an event detector 263 or event detector 564 configured to detect channel information from at least one of an image output by a display 240 and sound output by a speaker 250; a filter 265 configured to select a channel change according to intention of a user by using a control code according to the channel change and the channel information; an integrator 266 configured to combine and learn at least one control code and channel information which correspond to the selected channel change; and a user interface (UI) constructor 267 configured to create a preferred channel UI in which a channel is changed in manipulation for at least a control code and channel information which represent higher frequencies of use in the at least one control code and the channel information which are learned.

The filter determines whether the channel information is different from a previously detected channel information if the channel information is detected from at least one of the output image, and the output sound, and determines the channel change as being performed according to the intention of the user if the detected channel information is different from the previously detected channel information.

Figure 4A:
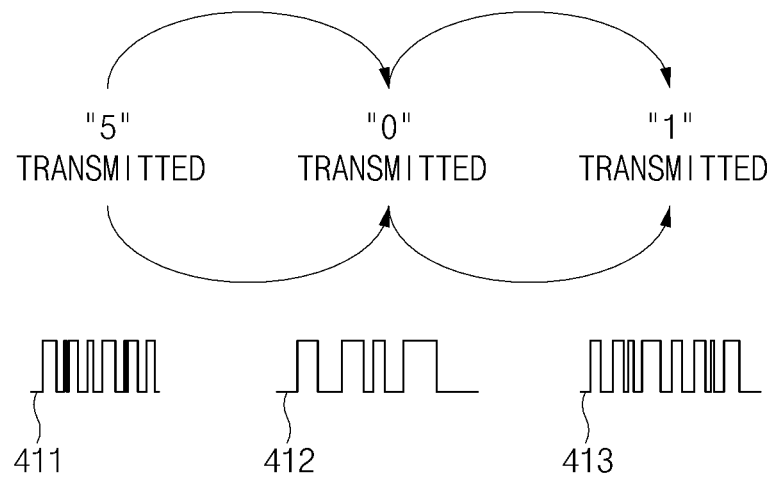
FIGS. 4A and 4B are views illustrating procedures of creating and controlling a preferred channel UI of the display device, according to an exemplary embodiment.
Figure 4B:
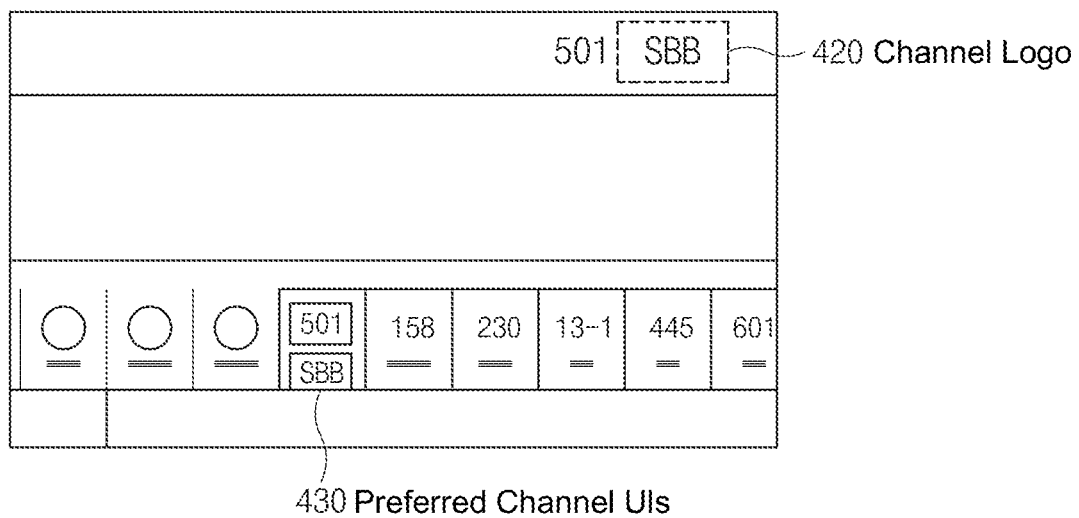

FIGS. 4A and 4B are views illustrating procedures of creating and controlling the preferred channel UI of the display device, according to an exemplary embodiment. FIGS. 4A and 4B illustrate the case of creating a preferred channel UI when a user performs a channel change to a channel of "SBB" by manipulating keys of "5", "0", and "1" within a specified period of time using the second remote controller which is a remote control of a set-top box.

If the user sequentially manipulates the keys of "5", "0", and "1" of the second remote controller, the second remote controller may wirelessly transmit a first control code 411 formed with a key code of "5" and a key code of the set-top box, a second control code 412 formed with a key code of "0" and the key code of the set-top box, and a third control code 413 formed with a key code of "1" and an ID code of the set-top box. The waveforms of the control codes illustrated in FIG. 4A are provided for the illustrative purpose, and are not intended to be limiting.

According to an exemplary embodiment, the first communication interface 210 may receive three wireless signals including the first, second, and third control codes 411, 412, and 413 from the second remote controller. The first communication interface 210 may extract the first, second, and third control codes 411, 412, and 413 from the received wireless signals and may transmit the first, second, and third control codes 411, 412, and 413 to the processor 260.

According to an exemplary embodiment, the processor 260 may determine that the first, second, and third control codes 411, 412, and 413 do not include a first ID code associated with the display device 20 and may analyze the first, second, and third control codes 411, 412 413 based on code identification information recorded in the memory 230. As the analysis result of the first to third control codes 411 to 413, the processor 260 may determine that the first to third control codes 411 and 413 are numeric keys, include the key codes of "5", "0", and "1", and include a second ID code serving as the ID code of the set-top box. The processor 260 may extract a channel logo of "SBB" from a specified area (e.g., the right upper portion 420) of an output image of a changed channel of "501". The processor 260 may determine that the channel of "SBB" is recognized by the threshold frequency of times (e.g., two times) from the memory 230, and not registered as a preferred channel. The processor 260 may create a preferred channel UI of the channel of "SBB". According to an exemplary embodiment, the preferred channel UI 430 of the channel of "SBB" may be associated with the outline information (e.g., a channel logo) of the channel of "SBB" and a first control instruction. The first control instruction may include an instruction for indicating that the first to third control codes 411 to 413 are transmitted if the preferred channel UI 430 of the channel of "SBB" is manipulated.

According to an exemplary embodiment, a user may select, by using the first remote controller, the preferred channel UI of the channel of "SBB" among a plurality of preferred channel UIs displayed on the display of the display device 20. The processor 260 may search for the control instruction for indicating that the first to third control codes 411 to 413 are sequentially transmitted for the channel change to the channel of "SBB" which is the preferred channel selected from the memory 230. The processor 260 may transmit the searched control instruction to the first remote controller 30 through the first communication interface 210.

According to an exemplary embodiment, if the control instruction is received from the display device 20, the first remote controller 30 may sequentially transmit the first to third control codes 411 to 413 to the set-top box within a specified period of time in response to the control instruction. If receiving the first to third control codes 411 to 413 from the first remote controller 30, the set-top box may perform a channel change to the channel of "SBB" and may output an image and sound of the channel of "SBB" to the display device 20 connected with the first interface. The display device 20 may perform a channel change to the channel of "SBB" which is the preferred channel selected through the first remote controller 30.

According to another exemplary embodiment, the processor 260 may perform a channel change to the preferred channel by transmitting the control instruction through the first interface instead of the first remote controller 30. For example, as the set-top box for providing the source for the channel of "SBB" selected in the preferred channel UI by the user is connected with the HDMI channel of the display device 20, and the HDMI channel is set as the external input, the set-top box may be considered set as a present source device of the display device 20. In this case, the processor 260 may instruct the set-top box to perform an SBB channel change by using a high definition multimedia interface-consumer electronics control (HDMI-CEC) function instead of using the first remote controller 30.

Figure 5:
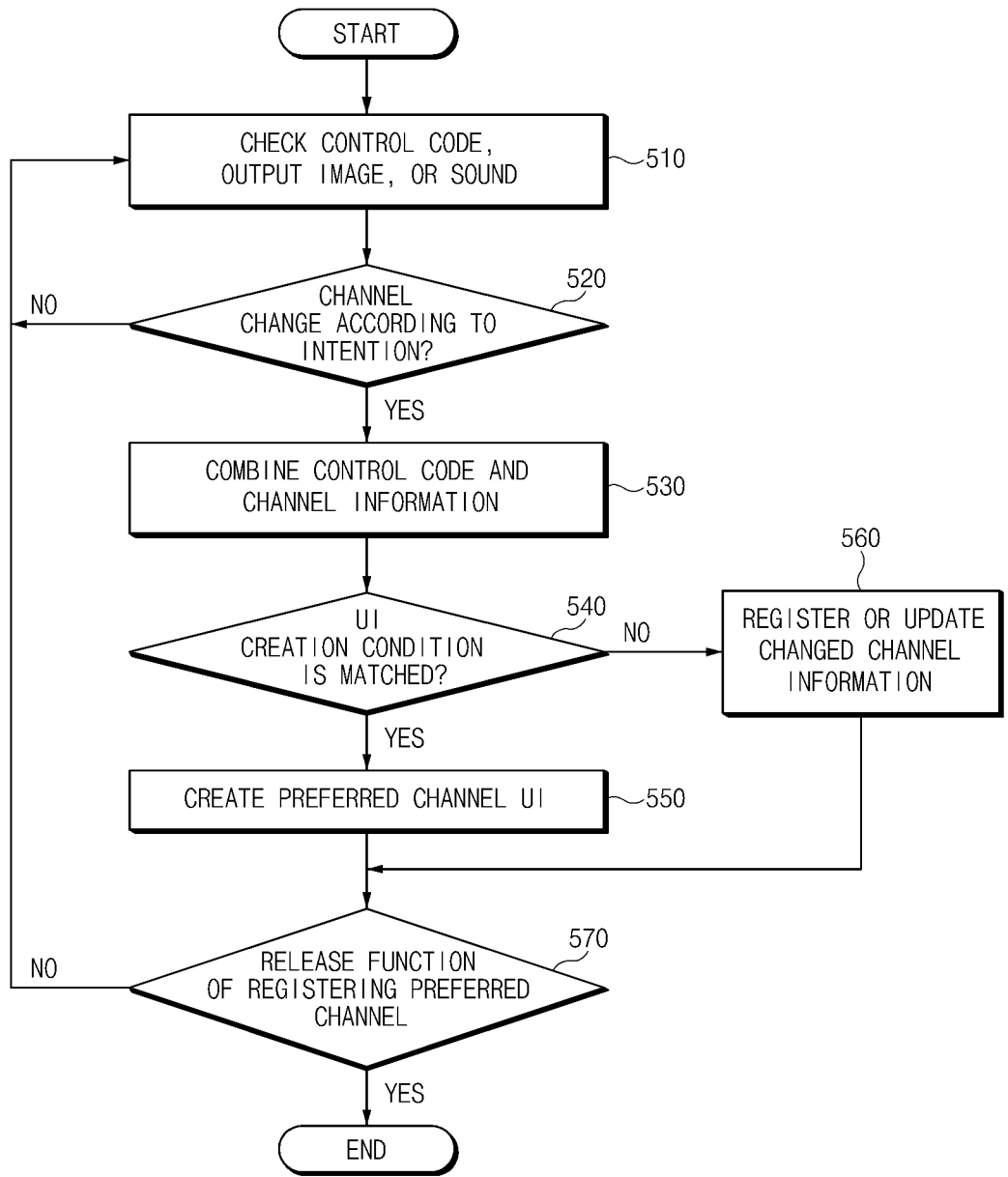
FIG. 5 is a flowchart illustrating a preferred channel learning method, according to an exemplary embodiment.

FIG. 5 is a flowchart illustrating a preferred channel learning method, according to an exemplary embodiment.

Referring to FIG. 5, in operation 510, the processor 260 may periodically check at least one of a control code, an output image, and an output sound. If the processor 260 receives a signal from the first communication interface 210, the processor 260 may extract a control code from the received signal. The processor 260 may perform operation 510 to operation 560 if a function of creating a preferred channel UI is selected by a user through the first communication interface 210.

In operation 520, the processor 260 may determine, based on at least one of the control code, the output image, and the output sound, whether the channel change is performed according to the intention of the user. For example, if the processor 260 determines channel information as being changed from at least one of the output sound and the output image, the processor 260 may determine the channel change as being performed. In operation 520, the processor 260 may not determine the channel change as being performed according to the intention of the user if the processor 260 fails to detect channel information from the at least one of the output sound and the output image after receiving the control code. If the changed channel is held for a specified period of time, the processor 260 may determine the channel change as being performed according to the intention of the user. According to an exemplary embodiment, the processor 260 may detect the channel information from a specified area of the output image. The processor 260 may determine whether a channel name is determined by recognizing the output sound.

In operation 530, the processor 260 may combine (or link) the channel information with the control code in the case of the channel change according to the user intention. In operation 520, the processor 260 may further associate a control instruction to instruct the first remote controller to transmit a control code. The processor 260 may record the number of times of recognizing the corresponding control code and the channel information.

In operation 540, the processor 260 may determine, based on the preferred channel control information stored in the memory 230, whether the changed channel is matched with the UI creation condition. For example, the processor 260 may determine that the changed channel is satisfied with the UI creation condition if the changed channel is not registered as a preferred channel although the changed channel is recognized by the threshold number of times (e.g., three times) or more.

In operation 550, if the changed channel is matched with the UI creation condition, the processor 260 may create a preferred channel UI for the changed channel. In operation 550, the processor 260 may record the preferred channel UI and the control code (or the control instruction) in the memory 230 with a link between the preferred channel UI and the control code.

If the changed condition is not matched with the UI creation condition, the processor 260 may record or update at least one control code of the changed channel, channel information of the changed channel, and the number of times of recognizing the channel information in operation 560. In operation 560, the processor 260 may determine the changed channel as a preferred channel candidate, and then, if necessary, may record the at least one control code of the changed channel, the channel information of the changed channel, and the number of times of recognizing the channel information in the memory 230 to create the preferred channel UI.

If the processor 260 does not determine the channel change as being performed according to the intention of the user in operation 520, the processor 260 may neglect the determined channel change. The processor 260 may perform operations 510 to 570 until the function of registering the preferred channel is released by the first communication interface 210.

Figure 6:
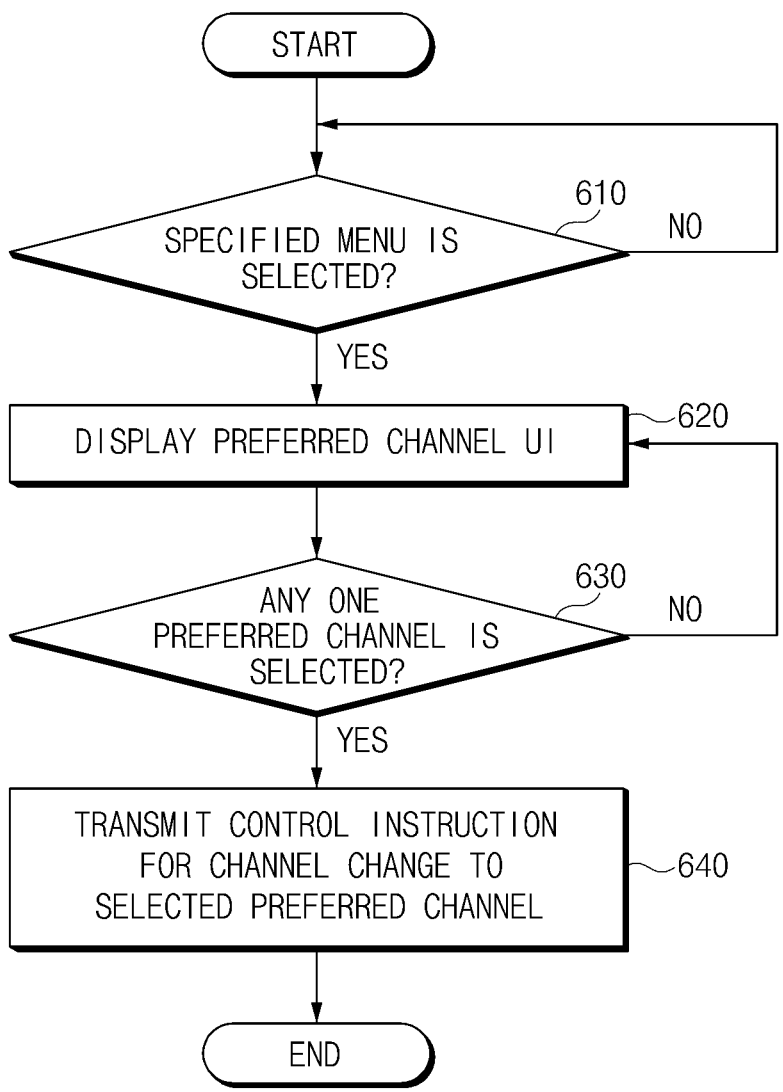
FIG. 6 is a flowchart illustrating a method of driving a preferred channel UI, according to an exemplary embodiment.

FIG. 6 is a flowchart illustrating a method of driving the preferred channel UI, according to an exemplary embodiment.

Referring to FIG. 6, in operation 610, the processor 260 may determine whether a specified menu is selected by the first remote controller. For example, the specified menu may be a menu corresponding to a home button, a menu button, a preferred channel button (favorites, or the latest use button) selected by the first remote controller.

In operation 620, the processor 260 may display the preferred channel UI including the outline information of the preferred channel if the specified menu is selected by the first remote controller is selected. In operation 620, the outline information of the preferred channel may be a channel name and/or a channel logo of the preferred channel, or the like.

In operation 630, the processor 260 may determine whether any one channel is selected from among preferred channels included in the preferred channel UI by the user. For example, the user may select any one channel from the preferred channel UI by using the first remote controller. The processor 260 may determine the information of the selected channel based on the signal received from the first remote controller.

In operation 640, the processor 260 may search for a control code corresponding to a channel selected from the memory 230 and may transmit a control instruction, which is used for indicating that the at least one control code is transmitted, to the first remote controller through the first communication interface 210. According to exemplary embodiments, the preferred channel UI may include not only an internal channel of the display device 20, but also an external channel provided by the peripheral device 10. Therefore, the user who is using the first remote controller may change the preferred channel to the external channel without using the second remote controller. Therefore, according to various exemplary embodiments, the convenience of the channel change to the preferred channel by the user may be significantly improved.

Figure 7:
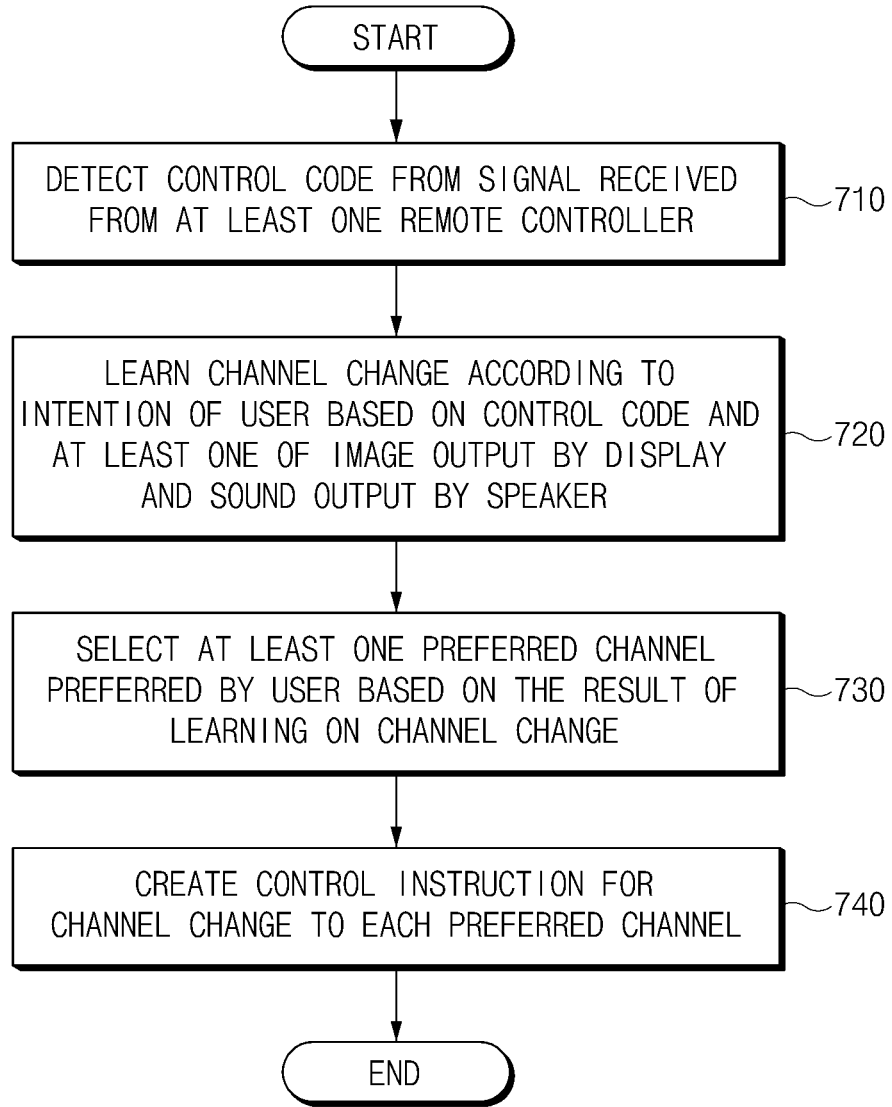
FIG. 7 is a flowchart schematically illustrating the preferred channel learning method, according to an exemplary embodiment.

FIG. 7 is a flowchart schematically illustrating the preferred channel learning method, according to an exemplary embodiment.

In operation 710, the processor 260 may detect a control code from a signal received from at least one remote controller.

In operation 720, the processor 260 may learn a channel change according to the intention of a user based on at least one of the control code, an image output by the display, and sound output from a speaker.

In operation 730, the processor 260 may select at least one preferred channel preferred by the user based on a learning result on the channel change.

In operation 740, the processor 260 may create a control instruction for a channel change to each preferred channel.

According to an exemplary embodiment of present disclosure, a display method by a display device includes detecting a control code from a signal received from at least one remote controller; learning a channel change according to intention of a user based on the control code and at least one of an image output by a display, and sound output by a speaker; selecting at least one preferred channel preferred by the user based on a result of the learning on the channel change; and creating at least one control instruction for changing a channel to the at least one preferred channel.

The learning of the channel change may include: detecting channel information from at least one of the image and the sound corresponding to the control code; determining whether the channel information is different from a previously detected channel information if the channel information is detected; and determining the channel as being changed if the detected channel information is different from the previously detected channel information.

The learning of the channel change may include: determining whether the changed channel is held for a threshold period of time; and determining the channel change as being performed according to the intention of the user if the changed channel is held for the threshold period of time.

The learning of the channel change may include: determining that the channel change is not performed according to the intention of the user if the channel information is not detected from the at least one of the image and the sound.

The learning of the channel change may include: analyzing a key code for the channel change from the control code based on code recognition information including at least one of a device type, a key type, and a key code.

The at least one remote controller may include at least one first remote controller configured to remotely control at least one peripheral device connected with the display device; and at least one second remote controller configured to remotely control the display device, wherein the creating of the at least one control instruction includes: analyzing at least one key code for the channel change to the preferred channel from the control code which is received from the at least one first remote controller; and creating the control instruction, which is analyzable by the second remote controller, by using the at least one key code, and wherein the control instruction allows the second remote controller to perform the channel change to the preferred channel for a peripheral device, which provide the preferred channel, in the at least one peripheral device.

The display method may further include creating at least one preferred channel UI for execution of the at least one control instruction; outputting the at least one preferred channel UI on the display if a specified menu is selected; determining whether one channel is selected from among channels included in the at least one preferred channel UI;

and transmitting a control instruction for a channel change to the selected channel to a second remote controller if the channel is selected.

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an exemplary embodiment may be, for example, implemented by instructions stored in a computer-readable storage media in the form of a program module. The instruction, when executed by a processor 260, may cause the one or more processors to perform a function corresponding to the instruction. The computer-readable storage media, for example, may be the memory 230.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an exemplary embodiment, and vice versa.

A module or a program module according to an exemplary embodiment may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to various exemplary embodiments, it will be understood by those skilled in the art that various changes in form and details may be made therein without departing from the spirit and scope of the present disclosure as defined by the appended claims and their equivalents.

What is claimed is:

1. A display device comprising:
a first communication interface configured to communicate with at least one remote controller, wherein the at least one remote controller includes a first remote controller configured to control the display device, and a second remote controller configured to control a peripheral device;
a display configured to output an image;
a speaker configured to output sound; and
a processor configured to:
detect a peripheral device control signal transmitted from the second remote controller to the peripheral device;
obtain a control code from the peripheral device control signal;
detect that a channel change has occurred in the peripheral device by analyzing the control code and at least one of the image and the sound;
in response to determining that a channel corresponding to the channel change satisfies a predetermined condition, determine the channel as a preferred channel; and
in response to determining that the preferred channel is selected while another channel is being provided in the display device and the peripheral device, transmit at least one control instruction for performing a channel change operation to change the channel to the preferred channel.

2. The display device of claim 1, wherein the processor is further configured to determine the channel as the preferred channel based on the channel being recognized a threshold number of times or more.

3. The display device of claim 1, wherein the processor is further configured to:
detect channel information of a current channel from at least one of a channel name and a channel logo in a specified area of the image;
determine whether the detected channel information is different from previously detected channel information of a previous channel; and
determine that the channel change has occurred if the detected channel information is different from the previously detected channel information.

4. The display device of claim 1, wherein the processor is further configured to:
recognize the sound using a voice recognition scheme;
based on detecting channel information of a current channel from the sound, determine whether the channel information is different from previously detected channel information of a previous channel; and
determine that the channel change has occurred based on determining that the detected channel information is different from the previously detected channel information.

5. The display device of claim 1, wherein the processor is further configured to determine that the channel change has occurred based on the channel being held for a period of time longer than a threshold period of time.

6. The display device of claim 1, further comprising:
a memory configured to store code recognition information including at least one of a device type, a key type, and a key code,
wherein the processor is further configured to determine a key code corresponding to the control code based on the code recognition information.

7. The display device of claim 1,
wherein the processor is further configured to determine a key code for changing the channel to the preferred channel from the control code received from the first remote controller, and create the at least one control instruction recognizable by the second remote controller using the key code, and
wherein the at least one control instruction allows the second remote controller to change the channel to the preferred channel using the peripheral device connected with the display device.

8. The display device of claim 1, wherein the processor is further configured to:

create a user interface (UI) for presenting at least one preferred channel comprising the preferred channel, and based on a specified menu being selected, output the UI to the display.

9. A display method by a display device, the display method comprising:

detecting a peripheral device control signal transmitted from at least one remote controller to a peripheral device;

obtaining a control code from the peripheral device control signal received from the at least one remote controller;

detecting that a channel change has occurred in the peripheral device by analyzing the control code and at least one of an image output by a display, and sound output by a speaker;

in response to determining that a channel corresponding to the channel change satisfies a predetermined condition, determine the channel as a preferred channel; and in response to determining that the preferred channel is selected while another channel is being provided in the display device and the peripheral device, transmitting at least one control instruction for performing a channel change operation to change the channel to the preferred channel.

10. The display method of claim 9, wherein the detecting that the channel change has occurred comprises:

detecting channel information of a current channel from at least one of the image and the sound corresponding to the control code;

determining whether the channel information is different from a previously detected channel information of a previous channel based on detecting the channel information; and determining that the channel change has occurred based on determining the detected channel information is different from the previously detected channel information.

11. The display method of claim 9, wherein the detecting that the channel change has occurred comprises:

determining whether the channel is held for a period of time longer than a threshold period of time; and determining that the channel change has occurred according to an intention of a user based on the channel being held for the period of time longer than the threshold period of time.

12. The display method of claim 9, further comprising:

determining that the channel change was not performed according to an intention of a user based on channel information is not being detected from the at least one of the image and the sound.

13. The display method of claim 9, wherein the detecting that the channel change has occurred comprises determining a key code corresponding to the control code based on code recognition information including at least one of a device type, a key type, and a key code.

14. The display method of claim 9, wherein the at least one remote controller comprises:

at least one first remote controller configured to remotely control the peripheral device connected with the display device; and at least one second remote controller configured to remotely control the display device, wherein the transmitting the at least one control instruction comprises:

determining at least one key code for changing the channel to the preferred channel from the control code received from the at least one first remote controller; and creating the at least one control instruction, which is recognizable by the second remote controller, using the at least one key code, and wherein the at least one control instruction allows the second remote controller to change the channel to the preferred channel using the peripheral device.

15. The display method of claim 9, further comprising:

creating a user interface (UI) for presenting at least one preferred channel;

based on a specified menu being selected, outputting the UI on the display, wherein the determining that the preferred channel is selected comprises determining whether the preferred channel is selected from among the at least one preferred channel through the UI.

16. A processor comprising:

a filter configured to select a channel change operation using a control code associated with the channel change operation and channel information;

wherein the processor is configured to:

detect a peripheral device control signal transmitted from a remote controller to a peripheral device;

obtain the control code from the peripheral device control signal;

detect the channel information of a current channel from at least one of an image output by a display, and sound output by a speaker;

combine the channel information with the control code associated with the selected channel change operation;

determine the current channel to be a preferred channel and create a preferred channel UI corresponding to the channel information and the control code based on a number of uses of the control code being higher than a threshold number of uses; and in response to determining that the preferred channel is selected while another channel is being provided in a display device and the peripheral device, transmit at least one control instruction for performing the channel change operation to change to the preferred channel.

17. The processor of claim 16, wherein the processor is further configured to:

detect the channel information based on at least one of the output image and the output sound, determine whether the channel information is different from a previously detected channel information of a previous channel, and determine that the channel change operation was performed according to an intention of a user if the detected channel information is different from the previously detected channel information.

* * * * *